United States Patent
Wei et al.

(10) Patent No.: US 9,448,368 B2
(45) Date of Patent: Sep. 20, 2016

(54) OPTICAL FIBER CONNECTOR

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Le-Peng Wei, Shenzhen (CN); Zhi-Ming Li, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/678,561

(22) Filed: Apr. 3, 2015

(65) Prior Publication Data

US 2016/0025937 A1    Jan. 28, 2016

(30) Foreign Application Priority Data

Jul. 25, 2014    (CN) .......................... 2014 1 0357797

(51) Int. Cl.
| | |
|---|---|
| G02B 6/36 | (2006.01) |
| G02B 6/38 | (2006.01) |
| G02B 6/245 | (2006.01) |

(52) U.S. Cl.
CPC ............. *G02B 6/3887* (2013.01); *G02B 6/245* (2013.01); *G02B 6/3881* (2013.01); *G02B 6/3825* (2013.01)

(58) Field of Classification Search
CPC .... G02B 6/245; G02B 6/381; G02B 6/3809; G02B 6/3825; G02B 6/3881; G02B 6/3887

USPC .......................................... 385/53–81, 84, 86
See application file for complete search history.

(56) References Cited

U.S. PATENT DOCUMENTS

| | | | | |
|---|---|---|---|---|
| 2009/0285534 A1* | 11/2009 | Ishikawa | .............. | G02B 6/3825 385/81 |
| 2010/0014811 A1* | 1/2010 | Uboldi | ................. | G02B 6/2558 385/55 |
| 2012/0106899 A1* | 5/2012 | Choi | .................... | G02B 6/3887 385/81 |
| 2012/0301085 A1 | 11/2012 | Grinderslev | | |

FOREIGN PATENT DOCUMENTS

| | | |
|---|---|---|
| JP | 1-179109 A | 7/1989 |
| JP | 2013-235069 | 11/2013 |

* cited by examiner

*Primary Examiner* — Akm Enayet Ullah
*Assistant Examiner* — Michael Mooney
(74) *Attorney, Agent, or Firm* — Zhigang Ma

(57) ABSTRACT

The present disclosure relates to an optical fiber connector for holding an optical fiber. The optical fiber connector includes a core and a cladding layer surrounding the core. The optical fiber connector includes an optical fiber holding apparatus, a ferrule unit, and a housing connecting to the optical fiber holding apparatus and the ferrule unit. The optical fiber holding apparatus includes a holding member with a first holding portion and a second holding portion. One of the first holding portion and the second holding portion includes at least one positioning pillar, and the other holding portion defines at least one positioning hole corresponding to the positioning pillar. The positioning pillar is configured to wind the clad strips locking the first holding portion and the second holding portion cooperatively to the optical fiber, and the positioning pillar is engaged with the positioning hole.

12 Claims, 6 Drawing Sheets

… (US 9,448,368 B2)

OPTICAL FIBER CONNECTOR

FIELD

The present disclosure relates to a connector, more particularly, to an optical fiber connector.

BACKGROUND

In the field of optical fiber communications, the optical fibers connect to each other or connect to electronic terminal devices through optical fiber connectors. A precise connection between the optical fiber connector and the optical fiber will determine the transmission efficiency of light signals.

BRIEF DESCRIPTION OF THE DRAWINGS

Implementations of the present technology will now be described, by way of example only, with reference to the attached figures.

DETAILED DESCRIPTION

Figure 1:
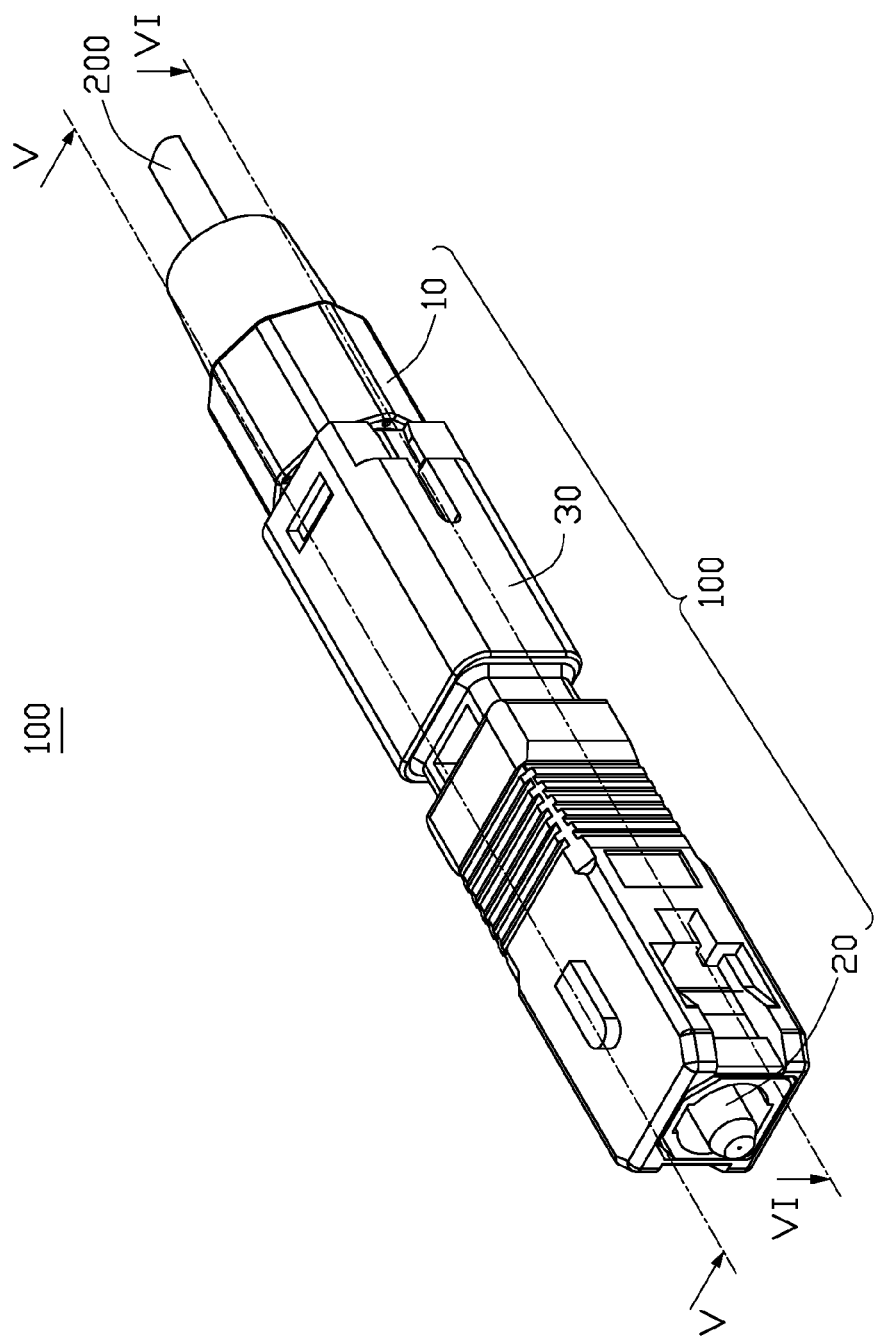
FIG. 1 is an isometric view of an optical fiber connector according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

FIG. 1. 1 illustrate an optical fiber connector 100 is used for connecting an optical fiber 200. The optical fiber connector 100 includes an optical fiber holding apparatus 10, a ferrule unit 20, and a housing 30 respectively connecting to the optical fiber holding apparatus 10 and the ferrule unit 20.

Figure 2:
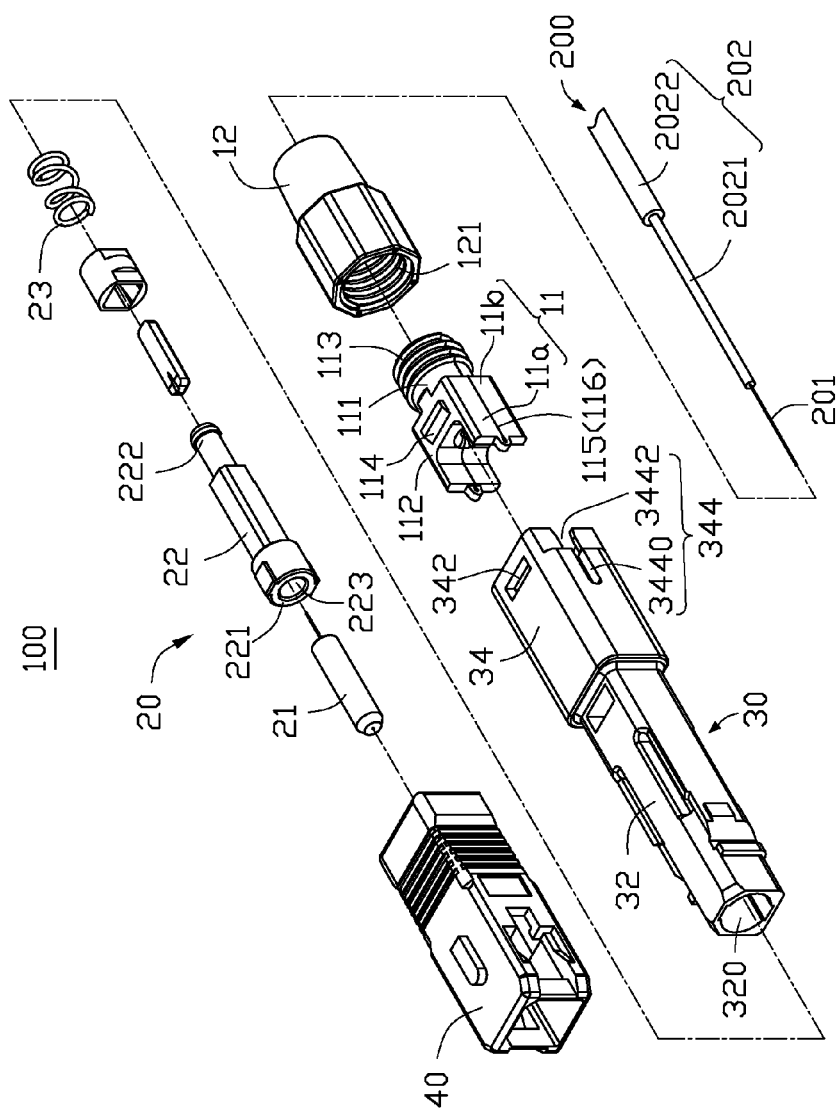
FIG. 2 is an isometric, exploded view of the optical fiber connector in FIG. 1 according to the present disclosure.

FIG. 2 illustrates the optical fiber holding apparatus 10 holding the optical fiber 200. The optical fiber 200 includes a core 201 and a cladding layer 202 covering the core 201. In this embodiment, the cladding layer 202 further includes an inner cladding layer 2021 and an outer cladding layer 2022. During assembling processes, a predetermined length of the cladding layer 202 is stripped. The stripped length of the outer cladding layer 2022 is larger than that of the inner cladding layer 2021. The optical fiber holding apparatus 10 includes a holding member 11 and a securing cover 12.

Figure 3:
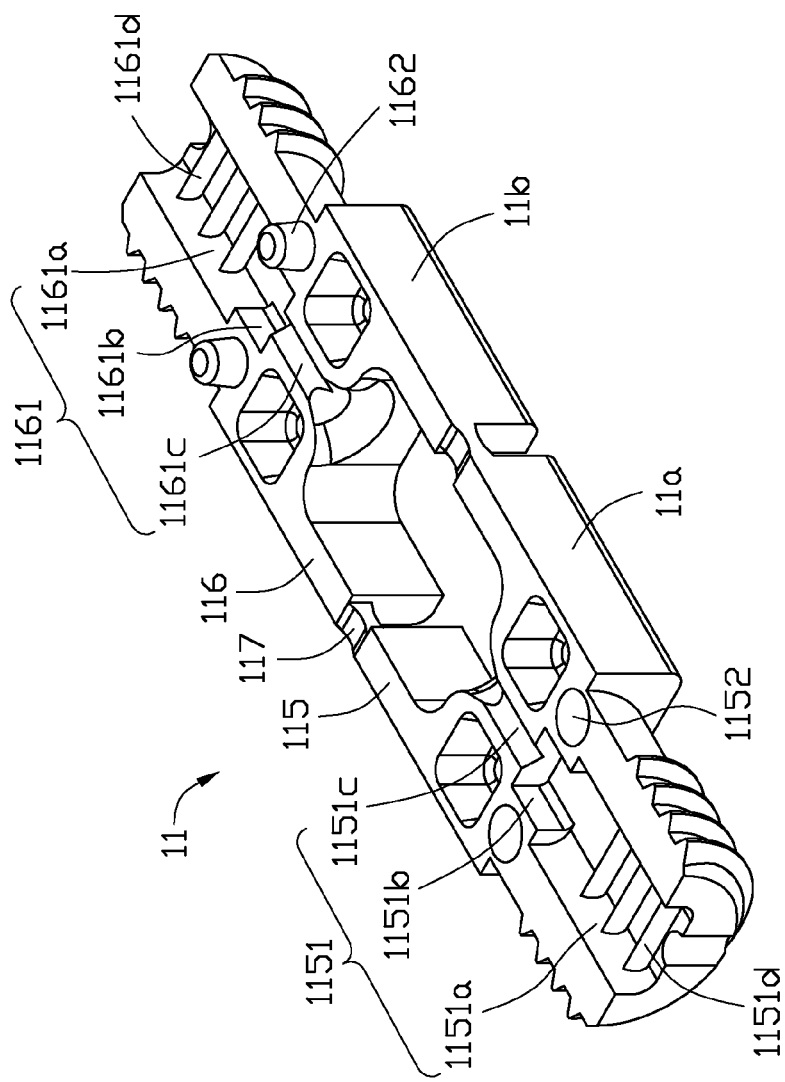
FIG. 3 is an isometric view of an optical fiber holding member of the optical fiber connector of FIG. 1.

FIG. 3 illustrates that the holding member 11 includes a first holding portion 11a and a second holding portion 11b connecting to the first holding portion 11a. The first holding portion 11a and the second holding portion 11b both have a first connecting end 111 toward the securing cover 12 and a second connecting end 112 toward the housing 30.

The first connecting end 111 is substantially a cylinder shape. An external thread 113 is formed on the peripheral side of the first connecting end 111. The second connecting end 112 is a square shape. Two protruding blocks 114 are formed on the second connecting ends 112 of the holding member 11. In this embodiment, one of the protruding blocks 114 is formed on one side of the first holding portion 11a opposite to the second holding portion 11b, and another protruding block 114 is formed on one side of the second holding portion 11b opposite to the first holding portion 11a. The shape of the protruding blocks 114 is rectangular trapezoidal. The number of protruding blocks 114 and the shape of protruding blocks 114 can be changed according to need. In addition, the protruding blocks 114 can be formed on the first holding portion 11a and on the second holding portion 11b.

Figure 4:
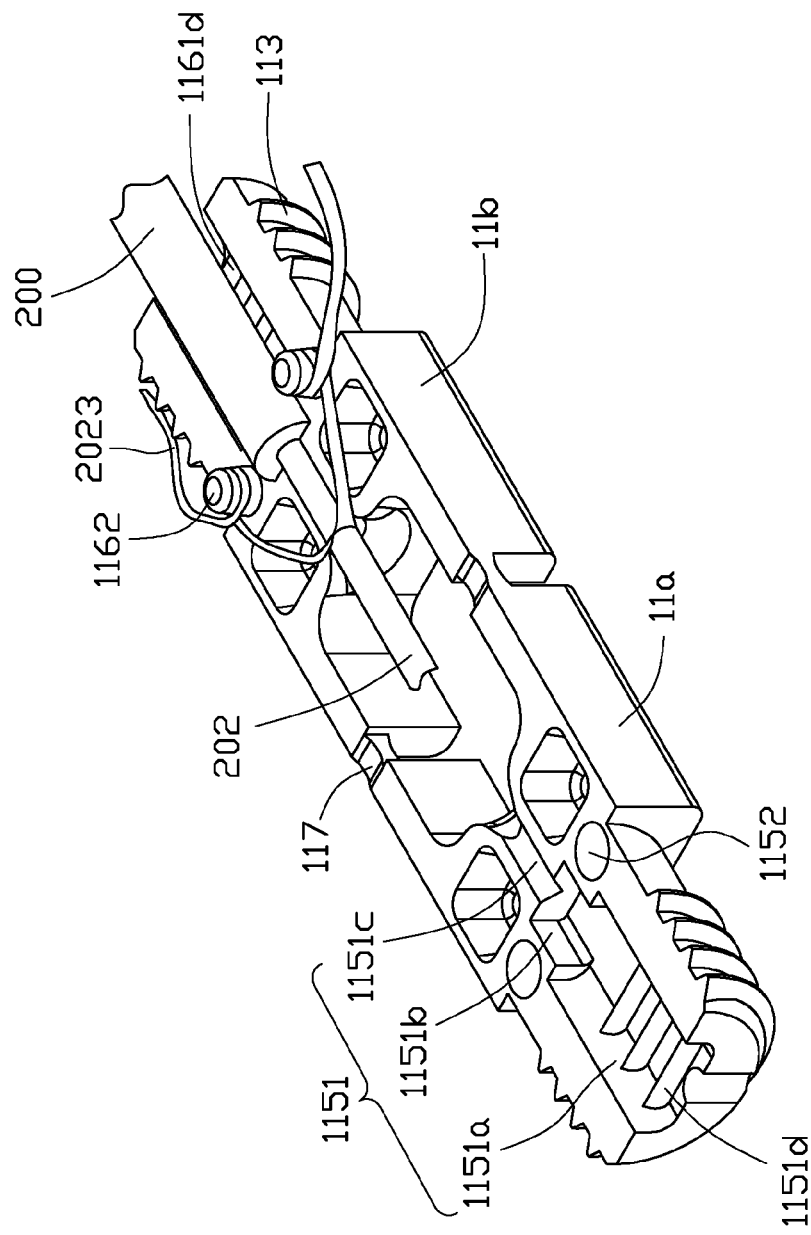
FIG. 4 is an isometric view of an optical fiber fixed by the optical fiber holding member of FIG. 3.

First and second holding portion 11a and 11b are folded about a center hinge 117 to form the holding member 11. FIG. 3 and FIG. 4 illustrate the unfolded state. The first holding portion 11a includes a first mating surface 115 toward the second holding portion 11b. A first installation groove 1151 and two positioning holes 1152 are arranged on the first mating surface 115. The first installation groove 1151 penetrates from an end of the first connecting end 111 of the first holding portion 11a to an end of the second connecting end 112 of the first holding portion 11a. In this embodiment, the first installation groove 1151 has three different sizes of groove portions including a first groove portion 1151a, a second groove portion 1151b, and a third groove portion 1151c. The first groove portion 1151a is near the first connecting end 111 of the first holding portion 11a. The third groove portion 1151c is near the second connecting end 112 of the first holding portion 11a. The second groove portion 1151b is between the first groove portion 1151a and the third groove portion 1151c. The second groove portion 1151b respectively connects the first groove portion 1151a and the third groove portion 1151c. A size of the first groove portion 1151a is larger than that of the second groove portion 1151b and the third groove portion 1151c. A size of the second groove portion 1151b is larger than that of the third groove portion 1151c.

The first groove portion 1151a, the second groove portion 1151b, and the third groove portion 1151c can be corresponding to the different sizes of optical fibers 200.

A plurality of first fastening ribs 1151d is arranged on a bottom of the first groove portion 1151a. In this embodiment, the first fastening ribs 1151d are striped-shaped and parallel to each other. The first fastening ribs 1151d are arranged along the direction from the first connecting end 111 to the second connecting end 112 of the first holding portion 11a. In other embodiments, the first fastening ribs 1151d are arranged at the second groove portion 1151b and the third groove portion 1151c. The two positioning holes 1152 are arranged at both sides of the first installation groove 1151. In this embodiment, the positioning holes 1152 are cylinder blind holes. The shape and the number of the positioning holes 1152 can be changed.

The second holding portion 11b has a similar shape and structure as the first holding portion 11a. The second holding portion 11b includes a second mating surface 116 toward the first holding portion 11a. A second installation groove 1161 corresponding to the first installation groove 1151 is arranged at the second mating surface 116. The second installation groove 1161 penetrates from an end of the first connecting end 111 of the second holding portion 11b to an end of the second connecting end 112 of the second holding portion 11b. In this embodiment, the second installation groove 1161 has different sizes of a fourth groove portion 1161a, a fifth groove portion 1161b, and a sixth groove portion 1161c. The fourth groove portion 1161a, the fifth groove portion 1161b, and the sixth groove portion 116c have similar sizes and structures as those of the first groove portion 1151a, the second groove portion 1151b, and the third groove portion 1151c, respectively.

The fourth groove portion 1161a is near the first connecting end 111 of the second holding portion 11b, and the sixth groove portion 1161c is near the second connecting end 112 of the second holding portion 11b. The fifth groove portion 1161b is between the fourth groove portion 1161a and the sixth groove portion 1161c. The fifth groove portion 1161b connects the fourth groove portion 1161a and the sixth groove portion, respectively. A plurality of second fastening ribs 1161d are arranged on a bottom of the first groove portion 1161a of the second installation groove 1161. The plurality of second fastening ribs 1161d have the similar shapes, sizes, and structures as the plurality of first fastening ribs 1151d.

The second holding portion 11b further includes two positioning pillars 1162 corresponding to the two positioning holes 1152 of the first holding portion 11a. The positioning pillars 1162 are convexly set on the second mating surface 116 and are respectively located at both sides of the second installation groove 1161. In this embodiment, the shape of the positioning pillars 1162 is frustoconical The locations of the positioning holes 1152 of the first holding portion 11a and the positioning pillars 1162 of the second holding portion 11b can be exchanged. The shape and the number of the positioning pillars 1162 plugging into the positioning holes 1152 can be changed.

FIG. 2 illustrates the shape of securing cover 12 is tubular. The end of the securing cover 12 toward the holding member 11 has an inside surface with an internal thread 121 to match with the corresponding external thread 113 of the holding member 11. The external thread 113 is combined by both of the first connecting ends 111 of the first holding portion 11a and the second holding portion 11b.

The ferrule unit 20 is used for the optical signal connection between the optical connector 100 and the external components (not shown). The ferrule unit 20 includes a ferrule 21, a ferrule holding member 22, and an elastic member 23.

The ferrule 21 is substantially a cylindrical shape and is made by ceramic materials. When connecting with the external components, the ferrule 21 prevents damage to the core 201 while being plugged in or unplugged.

The ferrule holding member 22 is substantially a hollow cylindrical shape. The ferrule holding member 22 includes a first end 221 and a second end 222 connected to the first end 221. The ferrule holding member 22 has a through hole 223 which penetrates from the end surface of the first end 221 to the end surface of the second end 222. One end of the ferrule 21 inserts into the through hole 223 from the first end 221, and the ferrule is fixed inside the through hole 223. Another end of the ferrule 21 is exposed to the surface outside of the first end 221.

The elastic member 23 is located on the second end 222 of the ferrule holding member 22. In this embodiment, the elastic member 23 is a spiral spring. One end of the elastic member 23 is located and fixed on the second end 222, and another end of the elastic member 23 is extended along the direction from the second end 222 to the first end 221 for a predetermined distance.

Figure 5:
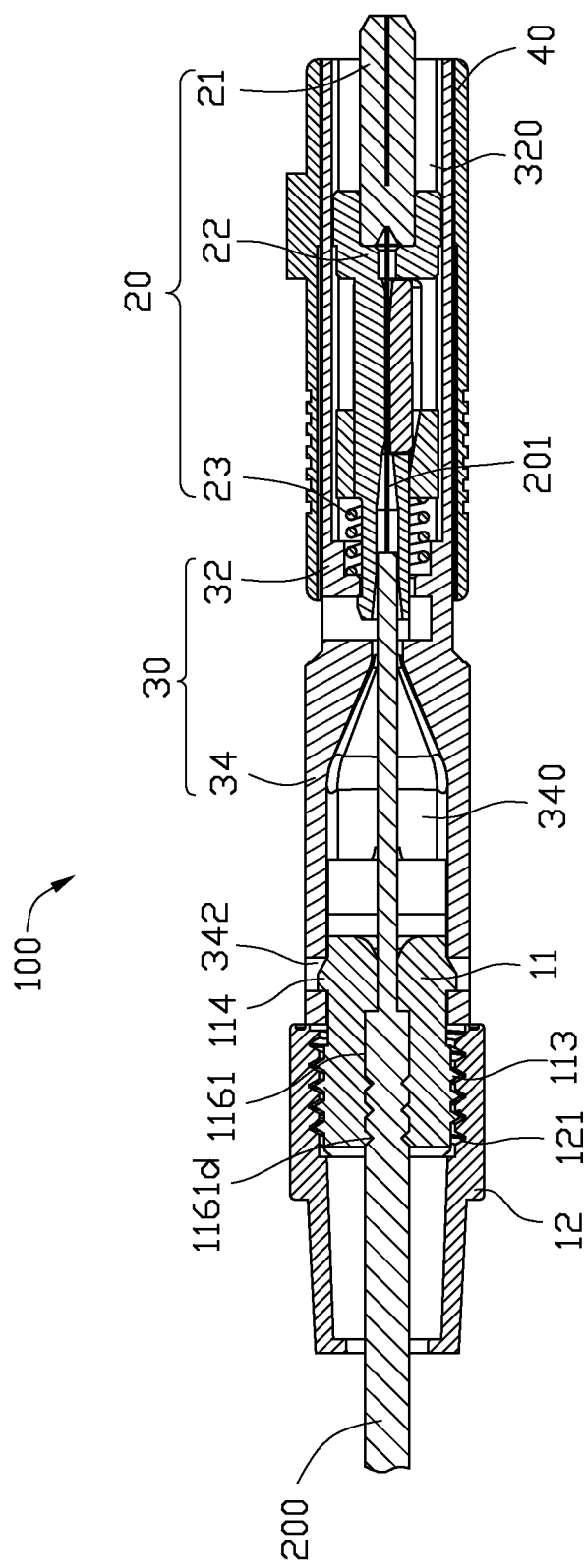
FIG. 5 is a cross-sectional view of the optical fiber connector of FIG. 1 along a line V-V.
Figure 6:
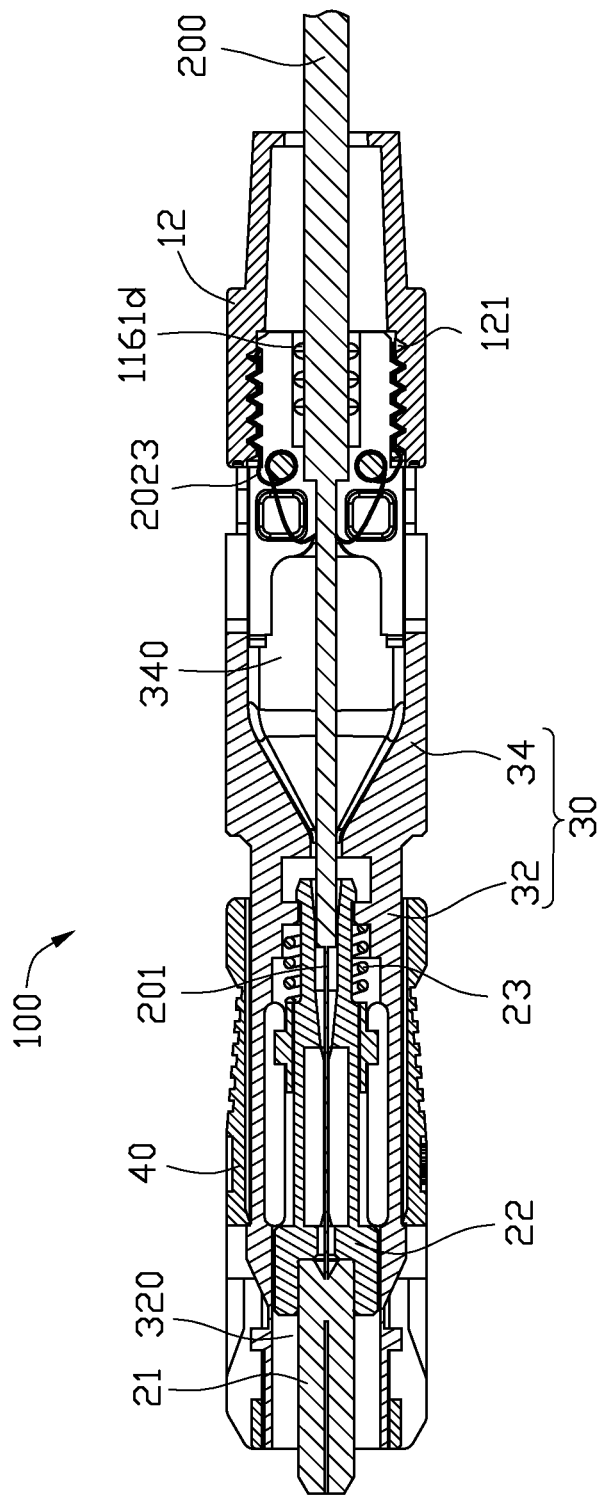
FIG. 6 is a cross-sectional view of the optical fiber connector of FIG. 1 along a line VI-VI.

FIG. 2 and FIG. 5-6 illustrate the housing 30 is substantially a sleeve shape. The housing 30 includes a front housing 32 and a rear housing 34 which is connected to the front housing 32. The inside of the front housing 32 comprises a first receiving portion 320. The rear housing 34 is substantially a square sleeve shape and the inside of the rear housing 34 has a second receiving portion 340 communicating with the first receiving portion 320. The rear housing 34 has two slots 342 respectively corresponding to the two protruding blocks 114 located on the two opposite side walls. In this embodiment, the slots 342 can be rectangular holes. The shape of the slots 342 can be changed to different shapes according to the shape of the protruding blocks 114. The rear housing 34 also has a disassembly slot 344 opened on the other two opposite side walls respectively. The disassembly slot 344 penetrates through the inner and outer surface of the corresponding side walls of the rear housing 34, and the disassembly slot 344 is also opened on the end surface of the rear housing 34 to have a back away from the front housing 32. The disassembly slot 344 is substantially a strip shape. In this embodiment, the disassembly slot 344 includes a first slot portion 3440 near the front housing 32, and a second slot portion 3442 communicating with the first slot portion 3440 away from the front housing 32. The width of the second slot portion 3442 is larger than that of the first slot portion 3440.

FIG. 2 illustrates the optical fiber connector 100 further includes a protection shell 40. In this embodiment, the protection shell 40 is a matching housing and is substantially a rectangular sleeve shape. The protection shell 40 is mainly used to match with a standard connector (SC) type adaptor. The optical fiber connector 100 can be used as a ferrule connector (FC), a local connector (LC) or other type optical fiber connector by changing the structure of the housing 30.

FIG. 1-FIG. 6 illustrate in assembly of the optical connector, the cladding layer 202 of the optical fiber 200 is first stripped to a predetermined length to expose a predetermined length of the core 201. Part of the stripped cladding layer is formed as the clad strip 2023. One stripped end of the cladding layer 202 is set within the second installation groove 1161. The clad strip 2023 is wrapped around the positioning pillar 1162 and set on the external thread 113 of the first connecting end 111. The first holding portion 11a is fastened with the second holding portion 11b when the positioning pillars 1162 of the second holding portion 11b are plugged into the corresponding positioning holes 1152 of the first holding portion 11a. The first holding portion 11a and the second holding portion 11b cooperatively lock the optical fiber 200 by engaging the positioning pillar with the positioning hole.

The first fastening ribs 1151d and the second fastening ribs 1161d engage with the cladding layer 202 to prevent the optical fiber 200 from loosening. And then, the securing cover 12 is connected to the first connecting end 111, and the internal thread 121 of the securing cover 12 is engaged with the external thread 113 of the holding member 11. The clad strips 2023 are interposed between the internal thread 121 and the external thread 113, and the optical fiber 200 is fastened on the optical fiber holding apparatus 10. Because the clad strips 2023 are wrapped around the positioning pillars and are fixed via the internal thread 121 and the external thread 113 during assembling, thus, the optical fiber 200 is more stably fixed to the optical fiber holding apparatus 10, and can sustain more tension without releasing from the optical fiber holding apparatus 10 to ensure the assembly accuracy and stability of the optical fiber connector 100. After the optical fiber 200 is fixed on the optical fiber holding apparatus 10, the core 201 of the optical fiber 200 is cut to a predetermined length or within a range of the predetermined length extending from the corresponding optical fiber holding apparatus 10.

FIG. 1-2 and FIG. 5-6 illustrate the ferrule unit 20 is received in the first receiving portion 320 of the housing 30, the ferrule unit 20 has a certain working distance with respect to the housing 30 for the elastic motion. In the embodiment, the second end 222 of the ferrule holding member 22 is inserted into the front housing 32 from one end facing the rear housing 34. The elastic member 23 elastically abuts and holds against the inner wall of the front housing 32 to prevent the ferrule holding member 22 from releasing from the front housing 32. After the second end 222 of the ferrule holding member 22 is inserted into the first receiving portion 320, the second end 222 is retained against the front housing 32 and is held near the rear housing 34. The assembly procedure between the ferrule unit 20 and the housing 30 ensures the ferrule 21 corresponding to the housing 30 has a certain flexible working distance. Therefore, preventing the ferrule 21 from being damaged by collision when the optical fiber connector 100 connects to the other devices.

After the ferrule unit 20 is assembled into the housing 30, the optical fiber 200 is fixed to the optical fiber holding apparatus 10 and the core 201 of the optical fiber 200 is cut to a predetermined length, the optical fiber holding apparatus 10 and the housing 30 are connected with each other. Specifically, the second connecting end 112 of the holding member 11 of the optical fiber apparatus 10 is inserted into the second receiving portion 340 from one side of the rear housing 34 away from the front housing 32. The protruding blocks 114 are respectively engaged with slots 342, and the optical fiber holding apparatus 10 and the housing 30 are fixedly connected with each other. The core 201 is inserted into the housing 30, and then aligned with the ferrule 21. Because the optical fiber 200 is fixed on the optical fiber holding apparatus 10 before being inserted into the housing 30, and the length of the core 201 is determined and cut with respect to the housing 30, therefore, a predetermined arching height of the core 201 corresponding to the ferrule 21 is obtained when the core 201 is inserted into the housing 30. There is no need to adjust the arch height of the core 201 through the optical fiber fallback procedure. It does not only simplify the optical fiber connector assembly, but also ensures the accuracy of the optical fiber connector assembly.

The protection shell 40 is sleeved on the front housing 32. The protection shell 40 can be located on the front housing 32 before the housing 30 is connected with the optical fiber holding apparatus 10. The protection shell 40 can also be located on the front housing 32 after the housing 30 is connected with the optical fiber holding apparatus 10.

The optical fiber connector 100 adapts the optical fiber holding apparatus 10 to fix the optical fiber 200 first, and then, the optical fiber holding apparatus 10 is connected with the housing 30, the optical fiber 200 has been cut to a predetermined length before assembly with the housing 30, and therefore, the assembling depth of the optical fiber 200 can be controlled through the connection of the optical fiber holding apparatus 10 and the housing 30. Not only is the assembly and disassembly of the optical fiber connector 100 simplified, but also the accuracy the optical fiber connector 100 is increased.

The embodiments shown and described above are only examples. Many details are often found in the art such as the other features of an optical fiber connector. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical fiber connector used for holding an optical fiber, comprising:
   an optical fiber holding apparatus which includes a holding member;
   a ferrule unit; and
   a housing which connects respectively the optical fiber holding apparatus and the ferrule unit, wherein the holding member includes a first holding portion and a second holding portion, one of the first holding portion and the second holding portion has at least one positioning pillar, and another one of the first holding portion and the second holding portion has at least one positioning hole, the first holding portion and the second holding portion cooperatively lock the optical fiber by engaging the positioning pillar with the positioning hole; and both of the first holding portion and the second holding portion comprise a first connecting end to connect with the securing cover, and a second connecting end to connect with the housing; and
   wherein the first holding portion comprises a first mating surface toward the second holding portion and the first mating surface defines a first installation groove; the second holding portion comprises a second mating surface toward the first holding portion and the second mating surface defines a second installation groove, both the first installation groove and the second installation groove comprise a first groove portion, a second groove portion, and a third groove portion; the first groove portion is near the first connecting end and the third groove portion is near the second connecting end, the second groove portion is located between the first groove portion and the third groove portion, the size of the first groove portion is larger than the sizes of the second groove portion and the third groove portion, and the size of the second groove portion is larger than the size of the third groove portion, the first groove portion, the second groove portion, and the third groove portion being used to install different sizes of optical fibers.

2. The optical fiber connector of claim 1, wherein the optical fiber holding apparatus comprises a securing cover which is connected to the holding member to fasten the first holding portion and the second hold portion.

3. The optical fiber connector of claim 1, wherein an external thread is formed on the peripheral side of the first connecting end, and an internal thread is formed on the inside of the securing cover to engage with the external thread.

4. The optical fiber connector of the claim 1, wherein at least one protruding block is formed on the second connecting end of the holding member, and at least one slot is formed on the housing corresponding to the at least one protruding block, the at least one protruding block is inserted into the corresponding slot to fasten the holding member with the housing.

5. The optical fiber connector of the claim 1, wherein a plurality of first fastening ribs are formed on a bottom of the first groove portion, the first fastening ribs are used to engage the cladding layer of the optical fiber.

6. The optical fiber connector of the claim 5, wherein the first fastening ribs are substantially parallel, and are arranged along the direction from the first connecting end to the second connecting end.

7. The optical fiber connector of claim 1, wherein the housing comprises a front housing and a rear housing being connected to the front housing, the inside of the front housing comprises a first receiving portion, the rear housing is substantially a square sleeve shape and the inside of the rear housing comprises a second receiving portion communicating with the first receiving portion, the second receiving portion being configured for receiving the optical fiber holding apparatus.

8. The optical fiber connector of claim 7, wherein the ferrule unit comprises a ferrule, a ferrule holding member, and an elastic member, the ferrule holding member includes a first end and a second end connected to the first end, the ferrule holding member has a through hole penetrating from the end surface of the first end to the end surface of the second end, one end of the ferrule inserts into the through hole from the first end, and the ferrule is fixed inside the through hole, another end of the ferrule is exposed to the surface outside of the first end.

9. The optical fiber connector of claim 8, wherein the elastic member is located on the second end of the ferrule holding member, and another end of the elastic member extends along the direction from the second end to the first end for a predetermined distance.

10. The optical fiber connector of claim 9, wherein the rear housing comprises a disassembly slot, the disassembly slot includes a first slot portion near the front housing, and a second slot portion communicating with the first slot portion away from the front housing.

11. The optical fiber connector of claim 10, wherein the width of the second slot portion is larger than that of the first slot portion.

12. The optical fiber connector of claim 11, wherein further comprises a protection shell being sleeved on the front housing, and the protection shell is substantially a rectangular sleeve shape.

* * * * *